United States Patent [19]

Kawachi et al.

[11] Patent Number: 5,041,480

[45] Date of Patent: Aug. 20, 1991

[54] FLUOROELASTOMER COMPOSITION

[75] Inventors: Shoji Kawachi, Hyogo; Yasuyoshi Furukawa, Osaka; Yutaka Ueta, Osaka; Hiroyuki Tanaka, Osaka; Masaru Hirai, Osaka, all of Japan

[73] Assignee: Daikin Industries, Ltd., Osaka, Japan

[21] Appl. No.: 753,065

[22] Filed: Jul. 9, 1985

[30] Foreign Application Priority Data

Jul. 9, 1984 [JP] Japan .................. 59-142985

[51] Int. Cl.$^5$ ........................................... C08K 5/16
[52] U.S. Cl. ...................................... 524/186; 524/462
[58] Field of Search ................... 524/186, 462

[56] References Cited

U.S. PATENT DOCUMENTS

| | | | |
|---|---|---|---|
| 2,510,112 | 6/1950 | Holbrook | 524/462 |
| 2,576,837 | 11/1951 | Irwin | 524/462 |
| 2,878,196 | 3/1959 | Buffington . | |
| 3,434,996 | 3/1969 | Salatiello et al. | 524/462 |
| 3,886,108 | 5/1975 | Snow, Jr. . | |
| 4,035,565 | 7/1977 | Apotheker et al. | 524/545 |
| 4,165,338 | 8/1979 | Katsushima et al. | 564/391 |
| 4,243,770 | 1/1981 | Tatemoto et al. | 570/137 |
| 4,472,294 | 9/1984 | Hisamoto et al. | 430/493 |
| 4,501,869 | 2/1985 | Tatemoto et al. | 570/137 |

FOREIGN PATENT DOCUMENTS

| | | |
|---|---|---|
| 0039058 | 11/1981 | European Pat. Off. . |
| 0144844 | 6/1985 | European Pat. Off. . |
| 2055874 | 3/1981 | United Kingdom ........ 524/462 |

OTHER PUBLICATIONS

Hackh's Chemical Dictionary (Fourth Ed. McGraw-Hill 1972), pp. 232 & 233.

Textbook of Polymer Science, Bill Meyers Jr., 1962–Ch. 16, pp. 419–424.

*Primary Examiner*—Joseph L. Schofer
*Assistant Examiner*—N. Sarofim
*Attorney, Agent, or Firm*—Birch, Stewart, Kolasch & Birch

[57] ABSTRACT

A fluoroelastomer composition comprising a fluoroelastomer, a fluorine-containing surfactant and optionally a vulcanizing agent which has improved processability, particularly mold releasability and mold contamination proofness.

19 Claims, No Drawings

FLUOROELASTOMER COMPOSITION

FIELD OF THE INVENTION

The present invention relates to a fluoroelastomer composition. More particularly, it relates to a fluoroelastomer composition which comprises a fluoroelastomer and a fluorine-containing surfactant and has improved processability.

BACKGROUND OF THE INVENTION

Fluoroelastomers such as vinylidene fluoride/hexafluoropropylene and tetrafluoroethylene/propylene copolymers are vulcanized by adding to them a vulcanizing agent followed by heating or by irradiating the fluoroelastomers as such. The thus vulcanized fluoroelastomers have excellent properties such as heat resistance and chemical resistance.

The conventional vulcanizable fluoroelastomer compositions, however, have inferior processability, particularly mold releasability and mold contamination proofness, to those of common non-fluoroelastomers. Especially, the fluoroelastomer composition containing a peroxide vulcanizing agent has worse mold releasability than those containing other vulcanizing agents.

SUMMARY OF THE INVENTION

One object of the present invention is to provide a fluoroelastomer composition having improved processability, particularly mold releasability.

Another object of the invention is to provide a fluoroelastomer composition which is improved in the processability but not deteriorated is elastomeric characteristics of the vulcanized fluoroelastomer composition.

According to the present invention, there is provided a fluoroelastomer composition comprising a fluoroelastomer, a fluorine-containing surfactant and optionally a vulcanizing agent.

DETAILED DESCRIPTION OF THE INVENTION

The fluoroelastomers used according to the present invention include any known vulcanizable fluoroelastomer. Specific examples of the fluoroelastomer are vinylidene fluoride/hexafluoropropylene copolymers, vinylidene fluoride/tetrafluoroethylene/hexafluoropropylene copolymers, vinylidene fluoride/chlorotrifluoroethylene copolymers. tetrafluoroethylene/propylene copolymers, hexafluoropropylene/ethylene copolymers, perfluoroalkyl vinyl ether (including one having plural ether linkages)/olefin (e.g. tetrafluoroethylene, ethylene, etc.) copolymers, fluorosilicone polymers, fluorophosphazene polymers and the like. These fluoroelastomers include ones having iodine atom(s) and/or bromine atom(s) bonded to the polymer chain which promote vulcanization of the fluoroelastomer (cf. 978, Japanese Patent Publication No. 4115/1978 and Japanese Patent Publication No. 20310/1984).

Examples of the fluorine-containing surfactant are those having at least one functional group selected from the group consisting of =N+—, =N, =NH, —NH$_2$, —O—, OH, —COO— and —COOH and at least one fluorine-containing aliphatic group. Preferably, the fluorine-containing surfactant has a softening or melting point not higher than 250° C. so that it can flow under the vulcanizing conditions.

Preferred examples of the fluorine-containing surfactant are those having the following general formulas:

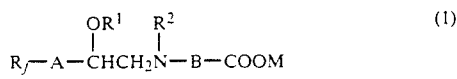

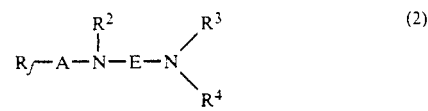

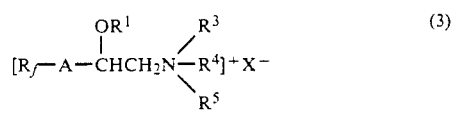

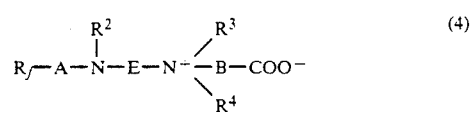

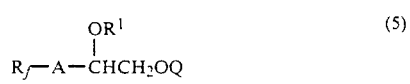

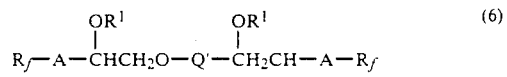

wherein $R_f$ is a straight or branched, saturated or unsaturated fluoro-$C_{3-21}$ aliphatic group which may be optionally substituted with a substituent (e.g., chlorine, bromine and iodine) or a straight or branched fluoro-$C_{3-21}$ (alkyloxy mono- or poly-alkyleneoxy-alkyl) group which may be optionally substituted with a substituent (e.g., chlorine, bromine and iodine): A is a group fo the formula:

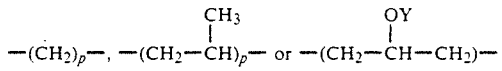

Y is a hydrogen atom or a C1-3 acyl group, p is an integer of 1 to 10: B and E are, the same or different, a $C_{1-60}$ alkylene group which is optionallY substituted with a substituent (e.g., chlorine, bromine, iodine, $C_{1-20}$ acyloxy, phenyl, substituted phenyl such as $C_{1-20}$ alkyl-phenyl, etc.): $R^1$ is a hydrogen atom or a $C_{1-5}$ acyl group: $R^2$ is a hydrogen atom, a $C_{1-20}$ alkyl group or a group of the formula: $R_f$—A—: $R^3$, $R^4$ and $R^5$ are, the same or different, a hydrogen atom, a $C_{1-5}$ alkyl group, a hydroxyl group or a carboxyalkyl group: Q is an aliphatic group which may be substituted with a substituent (e.g., chlorine, bromine, iodine, $C_{1-20}$ acyloxy, phenyl, substituted phenyl such as $C_{1-20}$ alkyl-phenyl, etc.) or an aromatic group which may be substituted with an substituent (e.g. hydroxy, chlorine, bromine, iodine, $C_{1-20}$ acyloxy, $C_{1-20}$ alkyl, etc.): Q' is a $C_{1-60}$ alkylene group or a $C_{2-60}$ mono- or poly-alkyleneoxy group: M is a hydrogen atom, alkali metal (e.g., sodium and potassium), an ammonium group or a substituted ammonium group (e.g., $C_{1-10}$ hydroxyalkylammonium, di($C_{1-10}$ hydroxy alkyl)ammonium, tri($C_{1-10}$ hydroxyalkyl)ammonium, $C_{1-10}$ alkylammonium, di($C_{1-10}$ alkyl)ammonium, tri($C_{1-10}$ alkyl)! -ammonium, etc.): and $X^-$ is an anion (e.g., iodide ion, chloride ion, bromide ion, hydroxide ion, sulfate ion, hydrogen sulfate ion, nitrate ion, carbonate ion, hydrogen carbonate ion, phosphate ion, hydrogen phosphate ion, dihydrogen phophate ion, borate ion, hydrogen borate ion, dihydrogen borate ion, $C_{1-20}$ alkanoate ion, (meth)acrylate ion, sulfonate ion, $N$-$C_{1-5}$ alkyl-$N$-$C_{1-5}$ acylamino $C_{1-5}$ alkanoate ion, ($C_{1-20}$ alkyl)benzenesulfonate ion, benzenesulfonate ion, $C_{1-5}$ alkanesulfonate ion, $C_{1-5}$ alkylsulfate ion, $C_{1-20}$ alkylphophate ion, di-$C_{1-20}$ alkyl phosphate ion, etc.). These compounds may be used in the form of their salts with, for example, hydrochloric acid, iodic acid, oxalic acid, sufuric acid, nitric acid, carbonic acid, phosphoric acid, boric acid, $C_{1-20}$ alkanoic acid, (meth)-acrylic acid, di-$C_{1-20}$ alkyl-$C_{2-4}$ alkanediate sulfonic acid, $N$-$C_{1-5}$ alkyl-$N$-$C_{1-5}$ acylamino $C_{1-5}$ alkanoic acid, ($C_{1-20}$ alkyl)benzenesulfonic acid, benzenesulfonic acid, $C_{1-5}$ alkanesulfonic acid, $C_{1-5}$ alkylsulfonic acid, $C_{1-20}$ alkylphophonic acid and di-$C_{1-20}$ alkyl phophonic acid. Among them, those in which $R_f$ is a $C_{3-21}$ perfluoroalkyl group are preferred.

Specific examples the fluorine-containing surfactant are as follows:

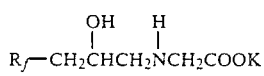 (7)

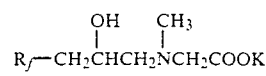 (8)

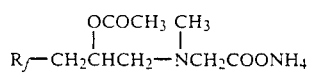 (9)

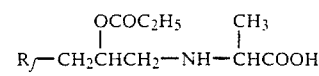 (10)

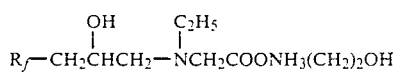 (11)

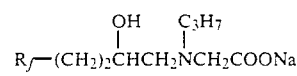 (12)

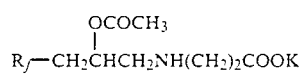 (13)

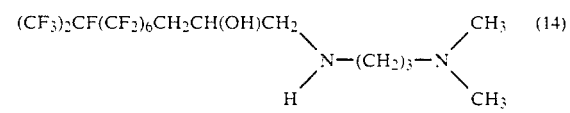 (14)

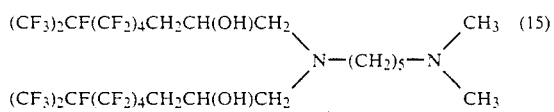 (15)

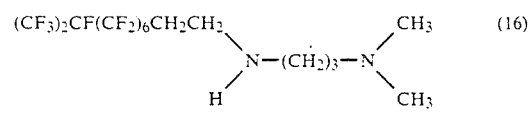 (16)

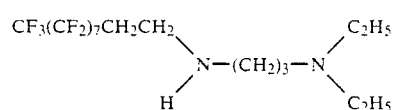 (17)

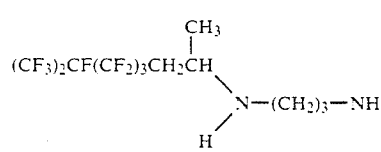 (18)

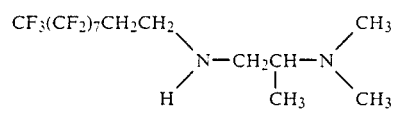 (19)

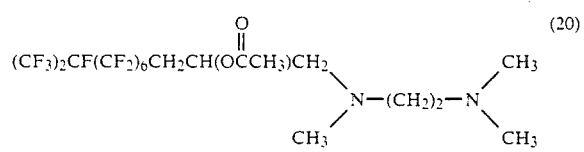 (20)

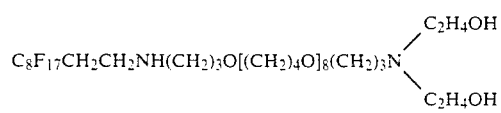 (21)

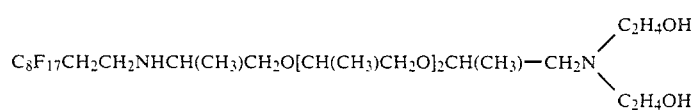 (22)

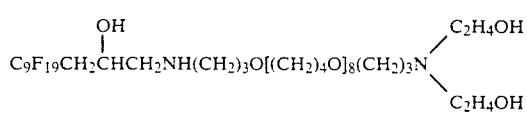 (23)

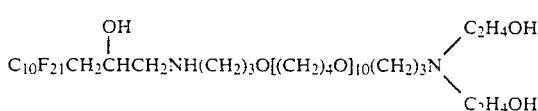 (24)

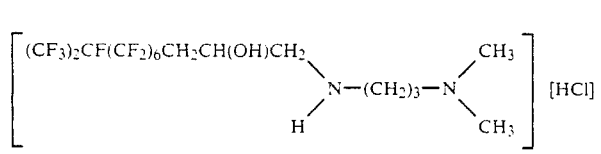 (25)

-continued
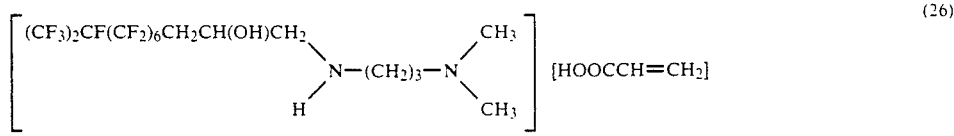 (26)
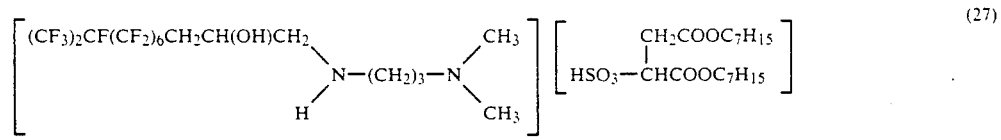 (27)
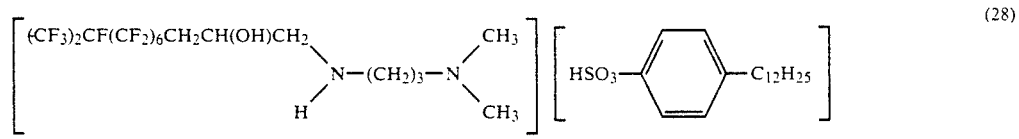 (28)
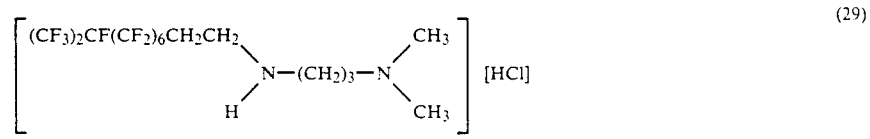 (29)
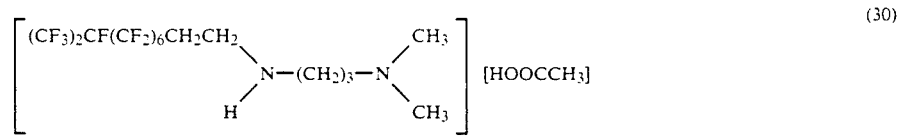 (30)
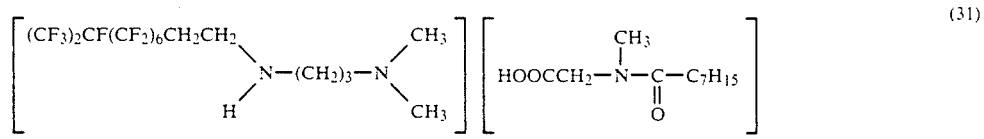 (31)
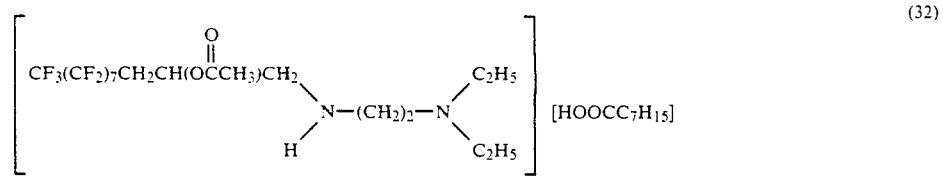 (32)
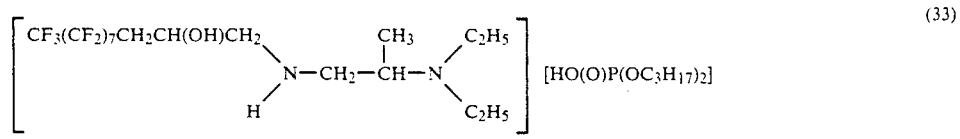 (33)
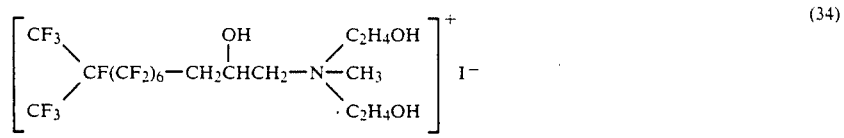 (34)
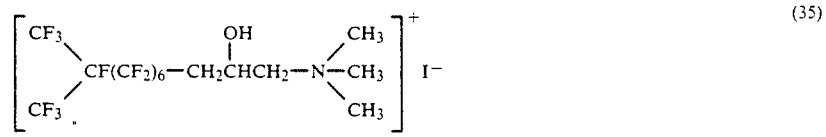 (35)
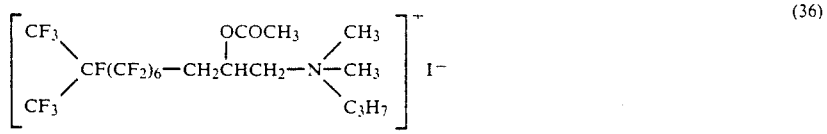 (36)

-continued
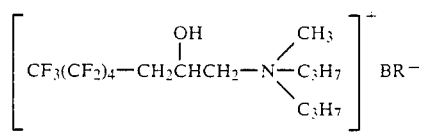 (37)
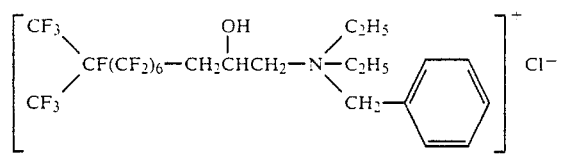 (38)
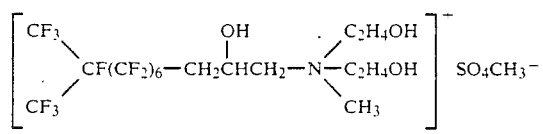 (39)
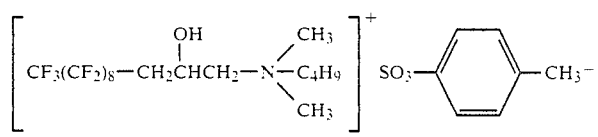 (40)
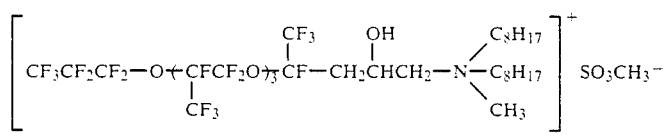 (41)
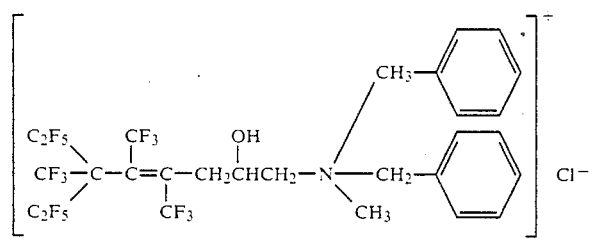 (42)
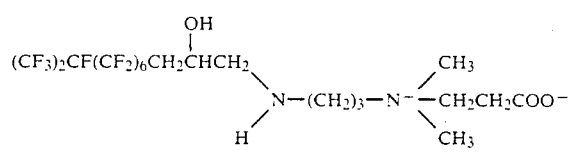 (43)
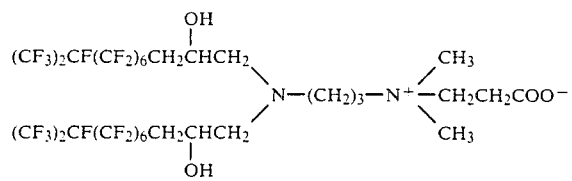 (44)
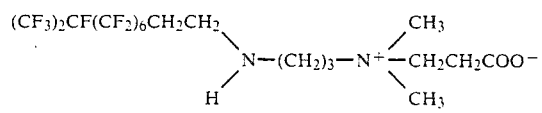 (45)
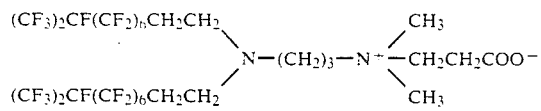 (46)

-continued
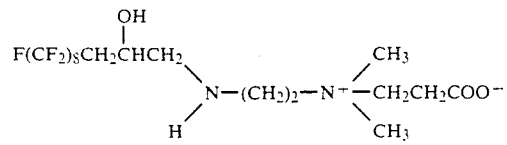  (47)
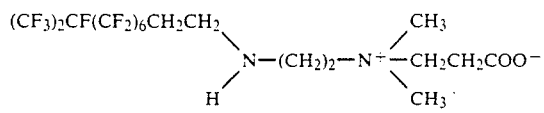  (48)
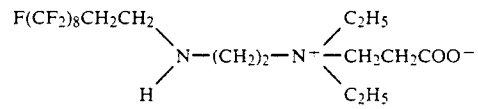  (49)
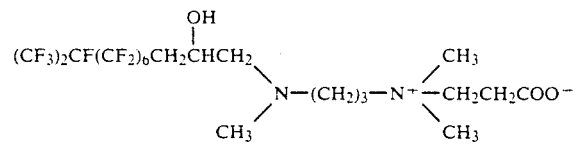  (50)
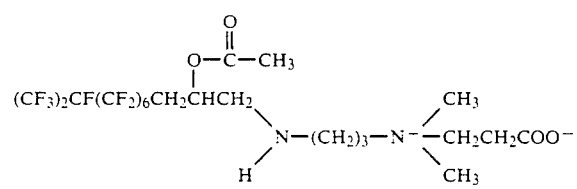  (51)
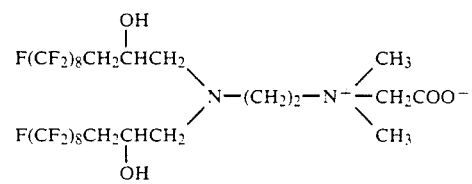  (52)
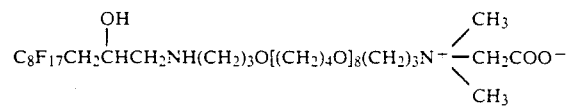  (53)
  (54)
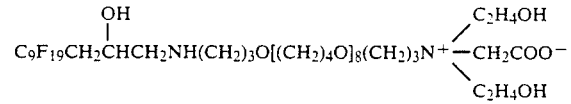  (55)
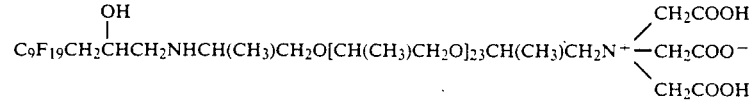  (56)
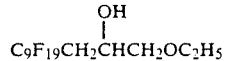  (57)  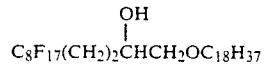  (58)
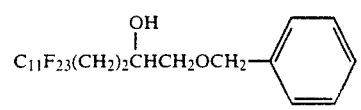  (59)  $\underset{|}{OH}$
$C_9F_{19}CH_2CHCH_2O(CH_2)_2OH$  (60)
  (61)  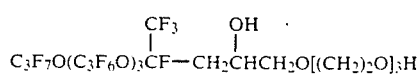  (62)

-continued $$\underset{C_5F_{11}(CH_2)_6CHCH_2O[(CH_2)_2O]_5H}{\overset{OH}{|}} \quad (63)$$

$$\underset{C_9F_{19}CH_2CHCH_2O[(CH_2)_2O]_{10}CH_3}{\overset{OH}{|}} \quad (64)$$

$$\underset{\underset{CF_3}{\overset{CF_3}{\diagdown}}CF(CF_2)_6CH_2CHCH_2O[(CH_2)_2O]_9CH_3}{\overset{OH}{|}} \quad (65)$$

$$\underset{C_{15}F_{31}CH_2CHCH_2O[(CH_2)_2O]_{20}H}{\overset{OH}{|}} \quad (66)$$

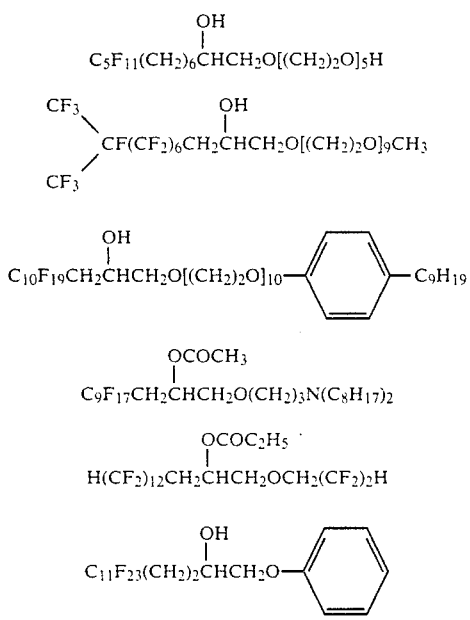
(67)

$$\underset{C_5F_{11}CH_2CHCH_2O(CH_2)_2OCH_2CHCH_2CH_2C_5F_{11}}{\overset{OH}{|}\quad\overset{OH}{|}} \quad (68)$$

$$\underset{C_9F_{17}CH_2CHCH_2O(CH_2)_3N(C_8H_{17})_2}{\overset{OCOCH_3}{|}} \quad (69)$$

$$\underset{C_{11}F_{23}CH_2CHCH_2O(CH_2)_2OCOC_4H_9}{\overset{OH}{|}} \quad (70)$$

$$\underset{H(CF_2)_{12}CH_2CHCH_2OCH_2(CF_2)_2H}{\overset{OCOC_2H_5}{|}} \quad (71)$$

$$\underset{C_5F_{11}CH_2CHCH_2O(CH_2)_4OCH_3}{\overset{OH}{|}} \quad (72)$$

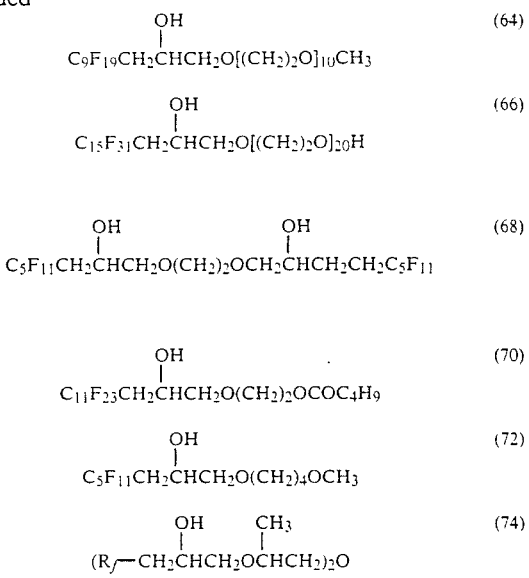
(73)

$$(R_f-CH_2\overset{OH}{\underset{|}{C}}HCH_2O\overset{CH_3}{\underset{|}{C}}HCH_2)_2O \quad (74)$$

The fluorine-containing surfactant is used as such or a mixture of two or more of them.

These surfactants are known and may be prepared by methods described in Japanese Patent Publication No. 61343/1982, Japanese Patent Kokai Publication Nos. 18944/1981, 156242/1981, 136534/1982 and 110534/1983, and Japanese Patent Applicaiton Nos. 47583/1983 and 236567/1983.

The amount of the fluorine-containing surfactant to be added depends on the kinds of the surfactant and/or the fluoroelastomer and processing conditions and is preferably from 0.01 to 10 parts by weight based on 100 parts by weight of the fluoroelastomer. When the amount of the surfactant is less than 0.01 parts by weight, the processability of the composition is not satisfactorily improved. When it is larger than 10 parts by weight, the characteristics of the molded composition such as hardness and modulus may be deteriorated.

The fluoroelastomer composition of the present invention does not necessarily contain any vulcanizing agent if it is vulcanized by irradiation.

The optionally added vulcanizing agent may be any of conventional ones such as an organic peroxide compound, a polythiol compound, a combination of a polyhydroxyl compound and a vulcanizing accelerator, a polyamine compound. The fluoroelastomer containing the vulcanizing agent is vulcanized by a suitable manner according to the kind of the vulcanizing agent.

When the fluoroelastomer composition contains the organic peroxide compound as the vulcanizing agent or is vulcanized by irradiation, it preferablY contains a polyfunctional compound having at least one functional group selected from the group consisting of $CH_2=CH-$, $CH_2=CH-CH_2-$ and $CH_2=CF-$.

When the vulcanizing agent is used, it is added to the composition in an amount of 0.01 to 10 parts by weight, preferably 0.5 to 5 parts by weight based on 100 parts by weight of the fluoroelastomer. The optionally used vulcanizing accelerator is added in an amount of 0.05 to 10 parts by weight, preferably 0.1 to 5 parts by weight based on 100 parts by weight of the fluoroelastomer.

The fluoroelastomer composition of the invention may contain other usually used additives such as a filler (e.g. carbon black, graphite, silica, diatomaceous earth, talc, fluororesin powder, etc.).

The fluoroelastomer composition of the invention is prepared by compounding the components by a per se conventional method, for example, by means of an open roll mill or a mixer.

The fluoroelastomer composition of the invention has following characteristics:
1. Its wrapping property during kneading with rollers is good.
2. It has excellent mold releasability and mold contamination proofness.
3. The compression set of the fluoroelastomer is not deteriorated.
4. The vulcanizing adhesivity of the fluoroelastomer is not influenced.
5. The fluoroelastomer composition of the invention has high vulcanizing rate.

The present invention will be hereinafter explained by following Examples.

Examples 1–7 and Comparative Examples 1–4.

To each of following fluoroelastomers, a fluorine-containing surfactant, a vulcanizing agent, a vulcanizing accelerator, a filler and an acid scavenger are added in the amounts shown in the Table to prepare a fluoroelastomer composition:

Fluoroelastomers
1. Daiel (trade mark) G-755 (vinylidene fluoride/hexafluoropropene copolymer, polyol vulcanizing type containing a vulcanizing agent).
2. Daiel (trade mark) G-501 (vinylidene fluoride/tetrafluoroethylene/hexafluoropropene copolymer, polyamine vulcanizing type).
3. Daiel (trade mark) G-801 (vinylidene fluoride/hexafluoropropene copolymer, peroxide vulcanizing type).

The composition was charged in a chrome plated mold for molding 30 pieces of P-24 O-rings (inner diameter of 24 mm and outer diameter of 30 mm) and press vulcanized at 160° C. under pressure higher than 35 kg/cm²G for 25 minutes. Thereafter, the molded O- rings were removed from the mold, and mold releasability and mold contamination were observed and evaluated according to the criteria described below.

The composition before heating was kept standing at 40° C. at relative humidity of 100 % for 3 days and subjected to a scorch test by measuring flowability by means of a flow tester. The result of the test is represented in terms of a ratio of flowability after kept standing to that of the blank (1 mm×1 mm×1 mm) of the composition before kept standing.

The results are shown in the Table.

For comparison, the fluoroelastomers not containing any fluorine-containing surfactant were tested on the same properties. The results are also shown in Table. In the Table, the amounts of the components are represented by "parts by weight".

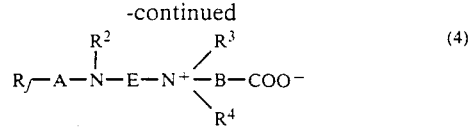

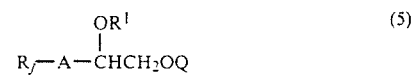

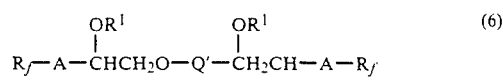

TABLE

| | Example No. | | | | | | | Comparative Example No. | | | |
|---|---|---|---|---|---|---|---|---|---|---|---|
| | 1 | 2 | 3 | 4 | 5 | 6 | 7 | 1 | 2 | 3 | 4 |
| Surfactant Compound No. | (8) | (14) | (8) | (24) | (14) | (30) | (8) | | Stearic acid | | |
| Amount | 0.3 | 1 | 1 | 1 | 1 | 1 | 1 | 0 | 0.3 | 0 | 0 |
| Fluoroelastomer | G-501 | G-755 | G-755 | G-755 | G-801 | G-801 | G-801 | G-501 | G-501 | G-755 | G-801 |
| Amount | 100 | 100 | 100 | 100 | 100 | 100 | 100 | 100 | 100 | 100 | 100 |
| MT-C[1] | 20 | 20 | 20 | 20 | 20 | 20 | 20 | 20 | 20 | 20 | 20 |
| DLP[2] | 15 | 0 | 0 | 0 | 0 | 0 | 0 | 15 | 15 | 0 | 0 |
| V-4[3] | 1.7 | 0 | 0 | 0 | 0 | 0 | 0 | 1.7 | 1.7 | 0 | 0 |
| MgO | 0 | 3 | 3 | 3 | 0 | 0 | 0 | 0 | 0 | 3 | 0 |
| Ca(OH)$_2$ | 0 | 6 | 6 | 6 | 0 | 0 | 0 | 0 | 0 | 6 | 0 |
| Perhexa 2,5B[4] | 0 | 0 | 0 | 0 | 1.5 | 1.5 | 1.5 | 0 | 0 | 0 | 1.5 |
| Triallyl isocyanurate | 0 | 0 | 0 | 0 | 4 | 4 | 4 | 0 | 0 | 0 | 4 |
| Mold releasing | ○ | ○ | ⊙ | ○ | ○ | ○ | ○ | Δ | ○ | Δ | X |
| Contamination proofness | ○ | ○ | ○ | ○ | ○ | ○ | ○ | X | X | Δ | X |
| Scorch test (%) | 90 | — | — | — | — | — | — | 40–50 | — | — | — |

Notes:
[1] Carbon black.
[2] Dibasic lead phosphite.
[3] Dicyclohexyldiamine carbamate.
[4] Manufactured by Nippon Oil and Fats Co., Ltd.
5 Criteria for mold releasing:
○: All pieces can be removed after 10 time molding.
⊙: Two or three pieces of 30 pieces remain in the mold cavities after 10 time molding.
Δ: Four or five pieces of 30 pieces remain in the mold cavities after 5 time molding.
X: More than half pieces remain in the mold cavities only after one time molding.
6 Criteria for contamination proofness:
○: Contamination is not observed after 10 time molding.
⊙: Contamination is not observed after 5 time molding.
Δ: Contamination is observed after 5 time molding.
X: Contamination is observed after one time molding.

What is claimed is:

1. A fluoroelastomer composition, comprising:
a fluoroelastomer; and
an effective amount of a fluorine-cotnaining surfactant for improving processability selected from the group consisting of the compounds having general formulas:

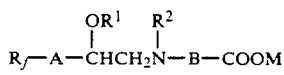

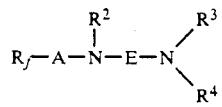

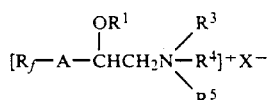

wherein $R_f$ is a straight or branched, saturated or unsaturated fluoro-$C_{3-21}$ aliphatic group or a straight or branched fluoro-$C_{3-21}$ (alkyloxy-mono- or poly-alkyleneoxy-alkyl) group; A is a group of the formula:

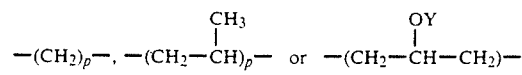

wherein Y is a hydrogen atom or a $C_{1-3}$ acyl group, p is an integer of 1 to 10; B and E are, the same or different, a $C_{1-60}$ alkylene group; $R^1$ is a hydrogen atom or a $C_{1-5}$ acyl group; $R^2$ is a hydrogen atom, a $C_{1-20}$ alkyl group or a group of the formula: $R_f$—A—; $R^3$, $R^4$ and $R^5$ are, the same or different, a hydrogen atom, a $C_{1-5}$ alkyl group, a hydroxyl group or a carboxyalkyl group; Q is an aliphatic group which may be substituted with a substituent or an aromatic group which may be substituted with a substituent; Q' is a $C_{1-60}$ alkylene group or a $C_{2-60}$ mono- or poly-alkyleneoxy group; M is a hydrogen atom, alkali metal, an ammonium group or a substituted ammonium group; and X is an anion.

2. The fluoroelastomer composition according to claim 1, wherein the fluorine-containing surfactant has a softening or melting point lower than 250° C.

3. The fluoroelastomer composition according to claim 1, wherein the fluoroelastomer is selected from the group consisting of vinylidene fluoride/hexafluoropropylene copolymers, vinylidene fluoride/tetrafluoroethylene/hexafluoropropylene copolymers, vinylidene fluoride/chlorotrifluoroethylene copolymers, tetrafluoroethylene/propylene copolymers, hexafluoropropylene/ethylene copolymers, perfluoroalkyl vinyl ether copolymers, flurosilicone polymers and flurophosphazene polymers.

4. The fluoroelastomer composition according to claim 1, wherein the saturated or unsaturated fluoro-$C_{3-21}$ aliphatic group or the straight or branch fluoro-$C_{3-21}$ group is substituted with a halogen selected from the group consisting of chlorine, bromine and iodine.

5. The fluoroelastomer composition according to claim 1, wherein the $C_{1-60}$ alkylene group or the aliphatic Q group is substituted with a substituent selected from the group consisting of chlorine, bromine, iodine, $C_{1-20}$ acyloxy, phenyl and $C_{1-20}$ alkyl-phenyl.

6. The fluoroelastomer composition according to claim 1, wherein the aromatic Q group is substituted with a substituent selected from the group consisting of hydroxy, chlorine, bromine, iodine, $C_{1-20}$ alkyl; or the alkali metal is selected from the group consisting of sodium and potassium; or the substituted ammonium group is selected from the group consisting of $C_{1-10}$ hydroxyalkylammonium, di($C_{1-20}$ hydroxy alkyl) ammonium, tri($C_{1-10}$ hydroxyalkyl) ammonium, $C_{1-10}$ alkylammonium, di($C_{1-10}$ alkyl) ammonium and tri($C_{1-10}$ alkyl)ammonium.

7. The fluoroelastomer composition according to claim 1, wherein X— is an anion selected from the group consisting of iodine ion, chloride ion, bromide ion, hydroxide ion, sulfate ion, hydrogen sulfate ion, nitrate ion, carbonate ion, hydrogen carbonate ion, phosphate ion, hydrogen phosphate ion, dihydrogen phosphate ion, borate ion, hydrogen borate ion, dihydrogen borate ion, $C_{1-20}$ alkanoate ion, (meth)acrylate ion, sulfonate ion, N-$C_{1-5}$ alkyl-N-$C_{1-5}$ acylamino $C_{1-5}$ alkanoate ion, ($C_{1-20}$ alkyl) benzenesulfonate ion, benzenesulfonate ion, $C_{1-5}$ alkanesulfonate ion, $C_{1-5}$ alkylsulfate ion, $C_{1-20}$ alkylphosphate ion and di-$C_{1-20}$ alkyl phosphate ion.

8. The fluoroelastomer composition according to claim 1, wherein $R_f$ is a $C_{3-21}$ perfluoroalkyl group.

9. The fluoroelastomer composition according to claim 1, further comprising a filler selected from the group consisting of carbon black, graphite, silica, diatomaceous earth, talc and fluororesin powder.

10. The fluoroelastomer composition according to claim 1, wherein the fluoroelastomer is selected from the group consisting of vinylidene fluoride/hexafluoropropene copolymer, vinylidene fluoride/tetrafluoroethylene/hexafluoropropene copolymer and vinylidene fluoride/hexafluoropropene copolymer.

11. The fluoroelastomer composition according to claim 1, wherein the fluorine-containing surfactant is selected from the group consisting of:

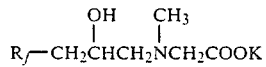

(8)

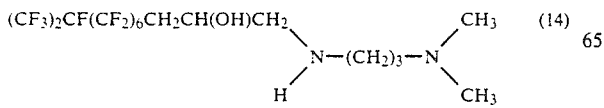

(14)

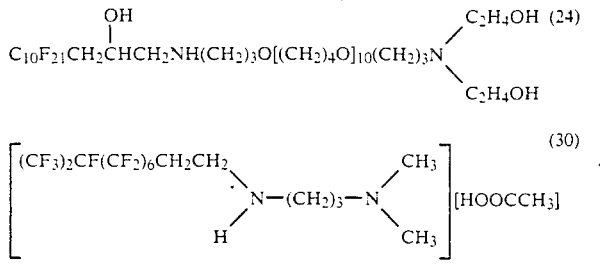

12. The floroelastomer composition according to claim 1, further comprising an effective amount of a vulcaninzing agent.

13. The floroelastomer composition according to claim 12, wherein the vulcanizing agent is selected from the group consisting of an organic peroxide compound, a polythio compound, a polyamine compound and a combination of a polyhydroxyl compound and a vulcanizing accelerator.

14. The fluoroelastomer composition according to claim 12, wherein the vulcanizing agent is an organic peroxide which contains a polyfunctional compound having at least one functional group selected from the group consisting of $CH_2=CH-$, $CH_2=CH-CH_2-$ and $CH_2=CF-$.

15. The fluoroelastomer composition according to claim 12, wherein the vulcanizing agent is added in an amount of 0.01 to 10 parts by weight based on 100 parts by weight of the fluoroelastomer.

16. The fluoroelastomer composition according to claim 14, wherein the vulcanizing accelerator is added in an amount of 0.05 to 10 parts by weight, based on 100 parts by weight of the fluoroelastomer.

17. The fluoroelastomer composition according to claim 12, wheren the vulcanizing agent is added in an amount of 0.5 to 5 parts by weight based on 100 parts by weight of the fluoroelastomer.

18. The fluoroelastomer composition according to claim 13, wherein the vulcanizing accelerator is added in an amount of 0.1 to 5 parts by weight, based on 100 parts by weight of the fluorelastomer.

19. A fluoroelastomer composition, comprising:
a fluoroelastomer; and
a fluorine-containing surfactant in the amount of 0.01 to 10 parts by weight based on 100 parts by weight of the fluoroelastomer selected from the group consisting of the compounds having general formulas:

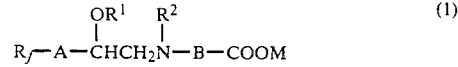

(1)

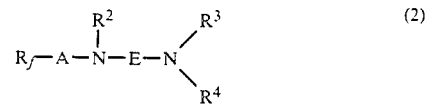

(2)

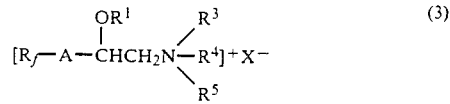

(3)

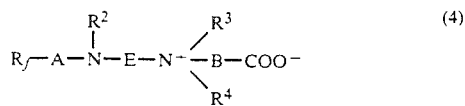

(4)

$$R_f\!-\!A\!-\!\overset{\overset{\displaystyle OR^1}{|}}{C}HCH_2OQ \qquad (5)$$

$$R_f\!-\!A\!-\!\overset{\overset{\displaystyle OR^1}{|}}{C}HCH_2O\!-\!Q'\!-\!CH_2\overset{\overset{\displaystyle OR^1}{|}}{C}H\!-\!A\!-\!R_f \qquad (6)$$

wherein $R_f$ is a straight or branched, saturated or unsaturated fluoro-$C_{3\text{-}21}$ aliphatic group or a straight or branched fluoro-$C_{3\text{-}21}$ alkyloxy-mono- or poly-alkyleneoxy-alkyl) group; A is a group of the formula:

$$-(CH_2)_p\!-\!,\ -(CH_2\!-\!\overset{\overset{\displaystyle CH_3}{|}}{C}H)_p\!-\ \text{or}\ -(CH_2\!-\!\overset{\overset{\displaystyle OY}{|}}{C}H\!-\!CH_2)\!-$$

wherein Y is a hydrogen atom or a $C_{1\text{-}3}$ acyl group, p is an integer of 1 to 10; B and E are, the same or different, a $C_{1\text{-}60}$ alkylene group; $R^1$ is a hydrogen atom or a $C_{1\text{-}5}$ acyl group; $R^2$ is a hydrogen atom, a $C_{1\text{-}20}$ alkyl group or a group of the formula: $R_f\!-\!A\!-$; $R^3$, $R^4$ and $R^5$ are, the same or different, a hydrogen atom, a $C_{1\text{-}5}$ alkyl group, a hydroxyl group or a carboxyalkyl group; Q is an aliphatic group which may be substituted with a substituent or an aromatic group which may be substituted with a substituent; Q' is a $C_{1\text{-}60}$ alkylene group or a $C_{2\text{-}60}$ mono- or poly-alkyleneoxy group; M is a hydrogen atom, alkali metal, an ammonium group or a substituted ammonium group; and $X^-$ is an anion.

* * * * *